United States Patent
Cui et al.

(10) Patent No.: US 9,936,404 B2
(45) Date of Patent: Apr. 3, 2018

(54) METHODS AND APPARATUSES FOR FAST RECOVERY (71) Applicant: MediaTek Singapore Pte. Ltd., Singapore (SG)

(72) Inventors: Xinwei Cui, Beijing (CN); Chenhao Gong, Tianjin (CN); Qiang Liu, Tianjin (CN); Xi Li, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 343 days.

(21) Appl. No.: 14/759,057

(22) PCT Filed: Jan. 6, 2014

(86) PCT No.: PCT/CN2014/070168
§ 371 (c)(1),
(2) Date: Jul. 2, 2015

(87) PCT Pub. No.: WO2014/106486
PCT Pub. Date: Jul. 10, 2014

(65) Prior Publication Data
US 2015/0334588 A1 Nov. 19, 2015

(30) Foreign Application Priority Data
Jan. 6, 2013 (CN) .......................... 2013 1 0004768

(51) Int. Cl.
*H04W 24/08* (2009.01)
*H04W 36/30* (2009.01)
(Continued)

(52) U.S. Cl.
CPC ........... *H04W 24/08* (2013.01); *H04W 36/26* (2013.01); *H04W 36/30* (2013.01); *H04W 36/0061* (2013.01); *H04W 36/14* (2013.01)

(58) Field of Classification Search
CPC ..... H04W 24/08; H04W 36/30; H04W 36/26; H04W 36/0061; H04W 36/14
(Continued)

(56) References Cited

U.S. PATENT DOCUMENTS 7,181,218 B2 * 2/2007 Ovesjo .............. H04W 36/0066
370/321
8,769,129 B2 7/2014 Watsen et al.
(Continued)

FOREIGN PATENT DOCUMENTS

CN 101437022 5/2009
CN 101626554 1/2010
(Continued)

OTHER PUBLICATIONS

International Search Report dated Apr. 16, 2014, issued in application No. PCT/CN2014/070168.

*Primary Examiner* — Kwang B Yao
*Assistant Examiner* — Syed M Bokhari
(74) *Attorney, Agent, or Firm* — McClure, Qualey & Rodack, LLP (57) ABSTRACT

The invention introduces a method and an apparatus for fast recovery. The fast recovery method comprises: evaluating data download qualities of non-current RATs (Radio Access Technologies) to obtain a candidate RAT list; determining whether a PS (Packet Service) download quality of a current RAT becomes worse; and if the PS download quality of the current RAT becomes worse, selecting one RAT from the candidate RAT list and switching to the selected RAT. The method and the apparatus for fast recovery introduced by the invention realize the seamless RAT switch and maintain the continuous data transmission.

24 Claims, 3 Drawing Sheets (51) Int. Cl.
*H04W 36/26* (2009.01)
*H04W 36/00* (2009.01)
*H04W 36/14* (2009.01)

(58) Field of Classification Search
USPC .................................... 370/252, 225, 310
See application file for complete search history.

(56) References Cited

U.S. PATENT DOCUMENTS

| | | | |
|---|---|---|---|
| 9,083,772 B2* | 7/2015 | Lin | H04L 12/66 |
| 9,258,769 B2* | 2/2016 | Ore | H04W 36/0061 |
| 2007/0027991 A1* | 2/2007 | Sikdar | H04L 63/0428 |
| | | | 709/227 |
| 2013/0258870 A1* | 10/2013 | Macias | H04W 48/18 |
| | | | 370/252 |
| 2014/0029493 A1* | 1/2014 | Vos | H04L 67/2823 |
| | | | 370/310 |
| 2015/0223106 A1* | 8/2015 | Van Phan | H04L 29/14 |
| | | | 370/225 |

FOREIGN PATENT DOCUMENTS

| | | |
|---|---|---|
| CN | 102264063 | 11/2011 |
| CN | 102629944 | 8/2012 |

\* cited by examiner

METHODS AND APPARATUSES FOR FAST RECOVERY

CROSS REFERENCE TO RELATED APPLICATIONS

This Application is a National Phase Application of PCT Application Serial No. PCT/CN2014/070168, filed on Jan. 6, 2014, which claims priority of China Patent Application No. 201310004768.1, filed on Jan. 6, 2013, the entireties of which are incorporated by reference herein.

TECHNICAL FIELD

The present invention relates to fast recovery, and in particular, to methods for fast recovery in data transmission.

BACKGROUND

An MMSS (Multi-Mode Single-Standby) UE (User Equipment) with a single SIM (Subscriber Identity Module) has multiple RAT (Radio Access Technology) modules, such as modems (modulator-demodulator) for different RATs (which may be referred to as RAT modems), in which only one RAT module is supported in the standby or connected mode at the same time, where the RAT may be GSM (Global System of Mobile communication), WCDMA (Wideband Code Division Multiple Access), TD-SCDMA (Time Division-Synchronous Code Division Multiple Access), CDMA2000 (Code Division Multiple Access 2000), LTE (Long Term Evolution), WiMAX (Worldwide Interoperability for Microwave Access) or WiFi (Wireless Fidelity) technology.

The radio environment in the wireless communications system is more complicated than the wired environment in which to perform the TCP (Transmission Control Protocol) data transmission. The signal strength of the initial RAT may become worse when the UE moves. The data transmission, a data download, may need to switch to another RAT if the signal strength of the initial RAT drops to an unacceptable level. Although a telecommunication operator typically supports more than one RAT, the network coverage of certain RATs may not be sufficient. The insufficient coverage often leads to many blind areas, and the data transmission is interrupted when the UE attempts to conduct a RAT switch in a blind area. The conventional TCP recovery mechanism is developed on the basis of the wired environment. The UE may suffer greater packet loss when adopting the conventional TCP recovery mechanism because the UE takes more time to recover a radio link in a wireless communications system than it does in a wired environment.

BRIEF SUMMARY

Accordingly, the invention introduces a method and an apparatus for fast recovery to address the aforementioned problems.

The invention introduces a fast recovery method comprising: evaluating data download qualities of non-current RATs (Radio Access Technologies) to obtain a candidate RAT list; determining whether a PS (Packet Service) download quality of a current RAT becomes worse; and if the PS download quality of the current RAT becomes worse, selecting one RAT from the candidate RAT list and switching to the selected RAT.

The invention further introduces another fast recovery method comprising: after switching RAT, sending a TCP (Transmission Control Protocol) SYN (Synchronization) packet to a transmitter.

The invention introduces a fast recovery apparatus comprising: N modems, where each of the N modems belongs to one RAT; and a main controller. The main controller collects data via the N modems, evaluates data download qualities of non-current RATs to obtain a candidate RAT list; and if the PS download quality of the current RAT becomes worse, selecting one RAT from the candidate RAT list and switching to the associated modem to perform a data download.

The invention introduces another fast recovery apparatus comprising: N modems, where each of the N modems belongs to one RAT; and a main controller. The main controller, after switching RAT, sending a TCP SYN packet to a transmitter.

The method and the apparatus for fast recovery introduced by the invention realize the seamless RAT switch and maintain the continuous data transmission.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The following describes embodiments in practice to illustrate the spirit of the invention and does not intend to limit the invention. It should be understood that the embodiments of the invention can be implemented in software, hardware, components, or any combinations thereof.

To conform to the TCP (Transmission Control Protocol), such as the RFC1122 standard, after sending a TCP segment, a transmitter sets a first specified time interval for the TCP segment and starts a timer to count down from the first specified time interval. The TCP segment is retransmitted if the transmitter hasn't received the TCP ACK (Acknowledge) for the TCP segment after the timer expires. After the TCP segment is retransmitted, the transmitter sets a second specified time interval for the TCP segment and starts the timer to count down from the second specified time interval that is longer than the first one. The subsequent retransmissions for the TCP segment can be deduced by analogy. In an embodiment, the specified time is increased exponentially. For example, the first specified time interval is 2 seconds, the second specified time interval is 4 seconds, and the subsequences are 8, 16, 32 seconds, and so on. Those skilled in the art may practice the timer with different time interval increments in TCP segment transmission and retransmission depending on the design requirements, and the invention shall not be limited thereto.

When moving to an area with weak signals, an UE (User Equipment) may need to hand off the data service to another RAT to maintain the data transmission. During the RAT switch, the UE may not reply with TCP ACK, leading to the TCP transmitter to retransmit the TCP segments and increase the timer for retransmission. Under the aforementioned TCP specification, the UE may need to reduce the time for the RAT switch to achieve fast recovery. In addition, for the specified time interval for the TCP retransmission counted by the network is increased, e.g. by the exponential growth, the TCP transmitter does not perform retransmission until the timer has reached the specified time interval even when the physical radio link of the switched RAT is ready, wherein the physical radio link may be the channel for data download. To achieve the TCP fast recovery, the UE may notify the TCP server as soon as possible after the physical radio link of the switched RAT is ready. Therefore, the invention introduces two methods for accelerating the PS (Packet Service) download recovery during the RAT switch: one is to switch to another RAT in light of the data download quality of the currently stayed RAT (also referred to as the current RAT for brevity); another is to recover the data download by sending the SYN (Synchronization) packet.

Switching to Another RAT in Light of the Data Download Quality of the Currently Stayed RAT The UE provides a PS quality timer (named TIMER_PS) to monitor the quality of the PS download traffic. After the timer times out, the UE performs the quality evaluation operation according to a predefined rule to evaluate the data download quality of all RATs supported by the UE, and sorts the evaluated quality of non-current RATs (that is, the current RAT is excluded) from the highest to the lowest.

If the data download quality of the current RAT becomes worse and the other RATs cannot satisfy the handoff condition to switch thereto, the UE will perform the quality evaluation procedure again (that is, restarts TIMER_PS and will evaluate the data download quality of all RATs according to the predefined rule after TIMER_PS times out). In order to prevent the TIMER_PS from being restarted too many times in a time interval, the maximum restart number MAX_PS is set, and the specified time intervals (may also referred to as time-out intervals) each time the TIMER_PS is restarted are different. In an embodiment, the specified time intervals are descending. Suppose that the specified time intervals are denoted as $T\_1, T\_2, \ldots, T\_MAX\_PS$, where the time-out interval after the kth restarts is $T\_k+1$, and k is an integer greater than zero and equal to or less than MAX_PS.

In an embodiment of the invention, the predefined rule is divided into two parts: one is associated with the data download quality of the current RAT; and the other is associated with that of the non-current RATs. The data download quality of the current RAT (named Cap_cur) is determined by several parameters, such as parameter 1, parameter 2, parameter 3 to parameter N, the weightings of the parameters are denoted as P1, P2, P3 to PN, where $P1+P2+P3+ \ldots +PN=1$, and N is an arbitrary integer depending on the design requirements. Assume that the evaluation score for the parameters are denoted as R1, R2, R3 to RN: The data download quality of the current RAT Cap_cur is calculated in the following equation:

$$Cap\_cur = R1 \times P1 + R2 \times P2 + R3 \times P3 + \ldots + RN \times PN \quad (1)$$

Depending on design requirements, Cap_cur threshold values for RATs may be set. In some embodiments, the Cap_cur threshold values are denoted as Cap_cur_RAT_X, where X indicates the type of the current RAT. For example, if the current RAT is GSM, the Cap_cur threshold value for GSM is denoted as Cap_cur_RAT_GSM, and the notations of the other Cap_cur threshold values can be deduced by analogy. When Cap_cur<Cap_cur_RAT_X, it is determined that the current PS download quality is bad and the UE needs to handoff the PS download traffic to another RAT. When Cap_cur≥Cap_cur_RAT_X, it is determined that the current PS download quality is good and the UE has no need to handoff the PS download traffic to another RAT.

In an embodiment of the invention, the parameters for determining the data download quality of the current RAT may be, for example, the signal strength of the current RAT, the signal strengths of the non-current RATs, the percentage of the total number of bad blocks, which cannot be decoded during the PS data transmission, over the total number of all received data blocks. The evaluation score of the current RAT is higher when the signal strength thereof is stronger, and vice versa. The evaluation score of the current RAT is lower when the signal strengths of the non-current RATs are stronger, and vice versa. The evaluation score of the current RAT is lower when the percentage of the total number of bad blocks over the total number of all received data blocks is higher, and vice versa. It should be understood that the specific magnitude of the evaluation score may be configured according to the design requirements, and the invention shall not be limited thereto. The obvious modifications and the equivalent arrangements by those skilled in the art without departing from the spirit of the invention fall within the scope of the invention.

The data download qualities of the non-current RATs (named Cap_non_cur) are merely related to the signal strengths thereof. Due to the standards for measuring the signal strengths of the RATs being different, the measurement results of different RATs cannot be sorted directly to obtain the order of Cap_non_cur (i.e. a "candidate RAT list"). In an embodiment of the invention, the generation of the "candidate RAT list" is described in the following.

Assume different RATs are denoted as RAT_X, where X indicates the type of one of the non-current RATs. Each RAT has N signal strength levels, such as the first signal strength level, the second signal strength level to the nth signal strength level, where N is an integer. That is, values 1 to N represent specific levels of the signal strengths of Cap_non_cur. The range of the Mth signal strength level of RAT_X is defined as Power_X_M_L to Power_X_M_H, where $1 \leq M \leq N$ (as shown in Table 1). It is to be understood that the specific magnitudes of Power_X_M_L and Power_X_M_H can be configured according to the design requirements, and the invention should not be limited thereto. Moreover, the invention does not exclude the case where Power_X_M_L equals to Power_X_M_H. In an embodiment of the invention, the signal strength range is further defined as: Power_X_M1_L=Power_X_M2_H, where $M1 \leq N$, $M2 \geq 1$ and $M1=M2+1$. Each signal strength of one RAT falls within one of N signal strength levels. Table 1 shows exemplary signal strength ranges for different RATs, such as GSM, LTE, etc., according to an embodiment of the invention.

TABLE 1

| Cap_non_cur | Signal strength ranges of different RAT_GSM levels | Signal strength ranges of different RAT_LTE levels | ... |
|---|---|---|---|
| 1 | Power_GSM_1_L~ Power_GSM_1_H | Power_LTE_1_L~ Power_LTE_1_H | ... |
| 2 | Power_GSM_2_L~ Power_GSM_2_H | Power_LTE_2_L~ Power_LTE_2_H | ... |
| ... | ... | ... | ... |
| N | Power_GSM_N_L~ Power_GSM_N_H | Power_LTE_N_L~ Power_LTE_N_H | ... |

In an embodiment of the invention, any RAT has a minimum acceptable level, and the RAT can be placed into a "candidate RAT list" when its signal strength exceeds the minimum acceptable level, defined as the Tth signal strength level, where $1 \leq T \leq N$. Taking RAT_GSM as an example, the RAT cannot be placed into the "candidate RAT list" when the signal strength level within which the signal strength falls is lower than "T". The specific minimum acceptable level "T" for each RAT can be set according to the design requirements, the minimum acceptable levels "T" between any two different RATs may be the same or different, and the invention shall not be limited thereto. The obvious modifications and the equivalent arrangements by those skilled in the art without departing from the spirit of the invention fall within the scope of the invention.

After TIMER_PS has timed out, the UE obtains the data download quality Cap_non_cur of each RAT by mapping the signal strength of the RAT to Table 1. The detailed method for generating the candidate RAT table is described below:

Step 1, every RAT_X having the obtained Cap_non_cur being lower than its minimum acceptable level "T" is removed.

Step 2, given the results of step 1, the remaining RAT_X are sorted in descending order in light of the obtained Cap_non_cur.

Step 3, the priority of RATs (for example, "Wifi>LTE>WiMAX>WCDMA>TD-SCDMA>CDMA2000>GSM>CDMA IS95") is provided when more than two remaining RATs having the same Cap_non_cur are presented. In one embodiment, the priorities of RATs for different signal strength levels are different. For example, for the first level, the priority "Wifi>LTE>WiMAX" is set while, for the second level, the priority "LTE>Wifi>WiMAX" is set. In another embodiment, the priorities of RATs (for example, "Wifi>LTE>WiMAX") for all signal strength levels are the same.

Step 4, the "candidate RAT list" is obtained according to the sorting performed in the above steps. The process ends.

In an embodiment of the invention, depending on the design requirements, the corresponding "T" for RAT_GSM is set to 2, the corresponding "T" for RAT_LTE is set to 3, the corresponding "T" for RAT_CDMA is set to 4, and the corresponding "T" for RAT_Wifi is set to 4. The current signal strength of RAT_GSM is −90 dB, which falls within the 1st signal strength level; the current signal strength of RAT_LTE is −85 dB, which falls within the 4th signal strength level; the current signal strength of RAT_CDMA is −80 dB, which falls within the 4th signal strength level; and the current signal strength of RAT_Wifi is −75 dB, which falls within the 5th signal strength level. Therefore, according to step 1, RAT_GSM is removed, and RAT_LTE, RAT_CDMA, and RAT_Wifi are kept. According to step 2, the order from the highest to the lowest is described below: RAT_Wifi with Cap_non_cur (i.e. 5) takes the highest position, followed by RAT_CDMA with Cap_non_cur (i.e. 4), and RAT_LTE with Cap_non_cur (i.e. 4) equally. According to step 3, for the 4th signal strength level, the priority "LTE>CDMA" is set. The adjusted order appears to be RAT_Wifi with Cap_non_cur (i.e. 5) taking the highest position, followed by RAT_LTE with Cap_non_cur (i.e. 4), followed by RAT_CDMA with Cap_non_cur (i.e. 4). As a result, the "candidate RAT list" is obtained.

Figure 1:
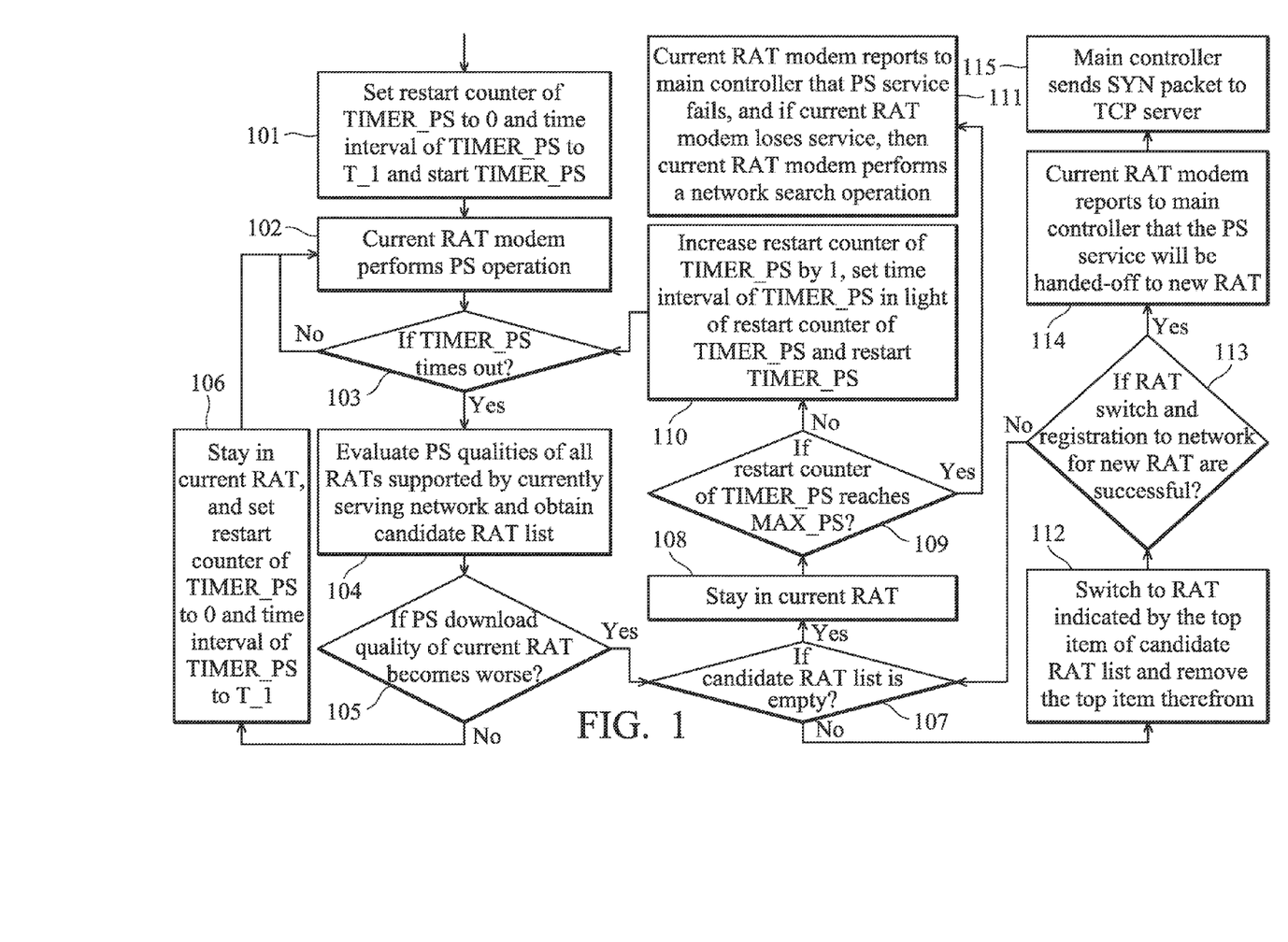
FIG. 1 is a flowchart illustrating a method for RAT switching during data download.

FIG. 1 is a flowchart illustrating a method for the RAT switching during data download, primarily executed by a main controller of a UE. As shown in FIG. 1, when requesting a data download service, the UE sets the restart counter of the TIMER_PS to zero and the specified time interval (time-out interval) of the TIMER_PS to the maximum T_1, and starts TIMER_PS (step 101). Then, the current RAT modem is triggered to perform a PS operation, such as a PS download operation (step 102). It is subsequently determined whether the TIMER_PS times out (step 103). The main controller continuously performs the PS download before the TIMER_PS times out (step 102); and evaluates the PS qualities (e.g. the data download qualities) of all RATs supported by the currently serving network (e.g. PLMN, Public Land Mobile Network) and obtains a candidate RAT list after the TIMER_PS times out (step 104). Then, it is determined whether the PS download quality of the current RAT becomes worse (step 105). If the PS data download quality of the current RAT is greater than or equal to the corresponding Cap_cur threshold value, it is determined that the current PS download quality is better and the UE will continue to stay in the current RAT, the restart counter of the TIMER_PS is set to zero, and the specified time interval (time-out interval) of the TIMER_PS is set to the maximum T_1 (step 106). After setting the restart counter of the TIMER_PS and the specified time interval of the TIMER_PS, the main controller triggers the current RAT modem to perform the PS service continuously (step 102). Conversely, if the PS data download quality of the current RAT is lower than the corresponding Cap_cur threshold value, it is determined that the current PS download quality has become worse and the UE needs to switch the PS service to another RAT. Then, it is determined whether the "candidate RAT list" is empty (step 107). If the "candidate RAT list" is empty, then the UE still stays in the current RAT (step 108). Subsequent to step 108, it is determined whether the restart counter of the TIMER_PS has reached the MAX_PS (step 109). If the TIMER_PS has reached the MAX_PS, the current RAT modem reports to the main controller that the PS service (such as the data download service) has failed. According to the related protocol specification, if the current RAT modem loses service, then the current RAT modem performs a network search operation (step 111). If the restart counter of the TIMER_PS has not reached the MAX_PS, then the restart counter of the TIMER_PS is increased by one, the specified time interval (time-out interval) of the TIMER_PS is set in light of the increased restart counter of the TIMER_PS, the TIMER_PS is restarted (step 110), and subsequently, it is determined whether the TIMER_PS times out (step 103). If it is determined, in step 107, that the current "candidate RAT list" is not empty, the PS service attempts to switch to a RAT indicated by the top item on the "candidate RAT list", and the top item is removed from the "candidate RAT list" (step 112). Following that, it is determined whether the RAT switch and a registration to the network for the new RAT are successful (step 113). If the RAT switch and the registration of the new RAT are successful, the current RAT modem reports to the main controller that the PS service will be handed-off to the new RAT (step 114). After receiving the report for the RAT hand-off, the main controller sends a SYN packet to the TCP server (step 115). Contrarily, if the RAT switch or the registration to the new RAT has failed, the process proceeds to step 107 to perform the determination again.

It should be understood that, in step 113, after switching to the new RAT, the UE is required to register to the network. For the purpose of fast recovery of the PS download service, a registration of the PS domain could be done first, and if necessary, then for the CS (Circuit Service) domain. For example, LTE only provides PS domain capability. In GSM, to the UE with limited capability, the registration of both the PS and CS domains cannot be done at the same time, that is, one of the PS and CS domains is registered first, and then the other. In the aforementioned circumstances, the PS domain is registered first.

By evaluating the PS download quality of the current RAT and selecting another RAT from the candidate RAT list to perform the handoff according to the evaluation results, the seamless RAT switch could be achieved to maintain the data transmission continuously, and an interruption of the data transmission link, which results from entering a blind area with certain RATs, could be avoided.

Recovering Data Download by Sending SYN Packets

With the download quality of the current RAT becoming worse during the data download, the transmitter will not receive ACKs corresponding to more and more data packets which have been sent, and retransmits the data packets. As discussed above, when no ACK has been received for a long time, the retransmission cycle becomes longer.

Referring to step 114 of FIG. 1, if the RAT switch and the registration of the new RAT are successful, the current RAT modem reports to the main controller that the PS service will be handed-off to the new RAT. After discovering that the serving RAT modem has been changed, in order to recover the data download as soon as possible, the main controller sends a TCP SYN packet to the transmitter for re-establishing the TCP connection and sets the maximum number MAX_SYN allowed to send the TCP SYN packets. The MAX_SYN can be defined depending on different design requirements and may be limited to a specific value. The obvious modifications and the equivalent arrangements by those skilled in the art without departing from the spirit of the invention fall within the scope of the invention.

Figure 2:
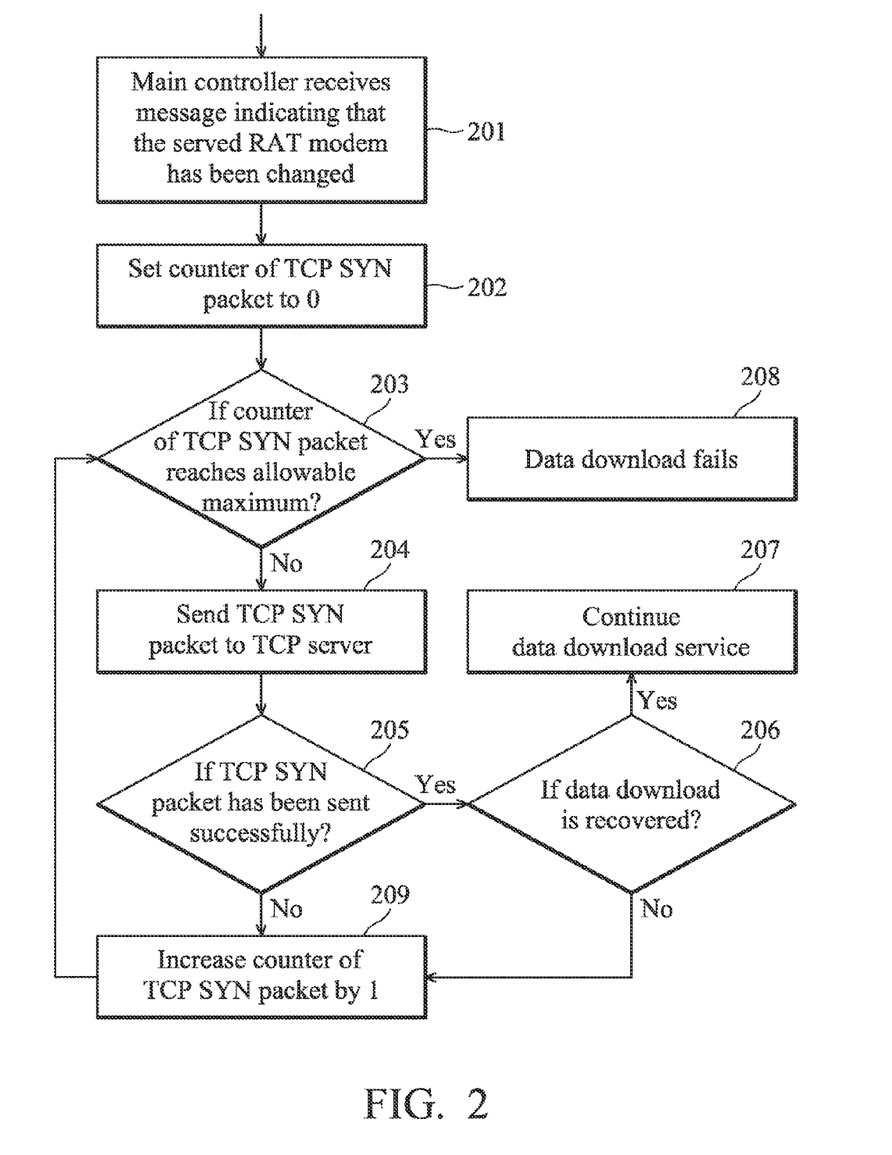
FIG. 2 is a flowchart illustrating a method for sending TCP SYN packets during data download.

FIG. 2 is a flowchart illustrating a method for sending TCP SYN packets during data download, primarily executed by a main controller of an UE. As shown in FIG. 2, after knowing that the served RAT modem has been changed (step 201), the main controller sets the counter of the TCP SYN packet to zero (step 202). Subsequently, it is determined whether the counter of the TCP SYN packet has reached the allowable maximum (i.e. MAX_SYN) (step 203). If the counter of the TCP SYN packet has not reached the MAX_SYN, a TCP SYN packet is sent to the TCP transmitter (server) (step 204). Regardless if it has reached the predetermined time for the TCP retransmission or not, once receiving a TCP SYN packet, the TCP transmitter sends a TCP SYN Acknowledge (TCP SYN ACK in brief) packet and attempts to retransmit the data packet. Next, the main controller determines whether the TCP SYN packet has been sent successfully by judging if the corresponding TCP SYN ACK packet has been received (step 205). If successful, it is determined whether the data download is recovered by judging if a new data packet has been received (step 206). In an embodiment of the invention, the data download is determined to be recovered when a new data packet has been received; otherwise, the download is determined to have not been recovered. If the data download is recovered, the data download service continues (step 207). If the data download is not recovered, the counter of the TCP SYN packet is increased by one (step 209) and the process proceeds to step 203. If, in step 203, it is determined that the counter of the TCP SYN packet has reached the MAX_SYN, the data download has failed (step 208). If, in step 205, it is determined that the TCP SYN packet fails to be sent, the process proceeds to step 209 to increase the counter of the TCP SYN packet by one.

By sending the TCP SYN packets to the transmitter to re-establish the TCP connection during the data download, the data transmission can be recovered as early as possible to reduce the wait time and avoid an interruption of the data transmission link.

Figure 3:
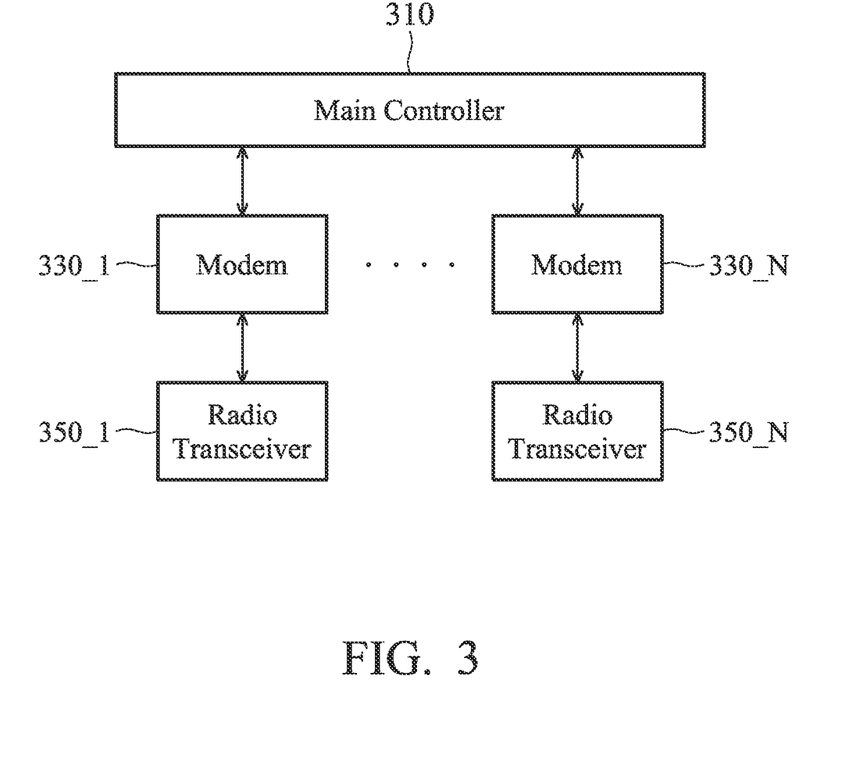
FIG. 3 is a diagram illustrating hardware modules practiced in a UE.

FIG. 3 is a diagram illustrating hardware modules practiced in an UE. The main controller 310 connects to modems 330_1 to 330_N, and each modem belongs to one RAT and connects to one radio transceiver for the data transceiving, where N is greater than or equals to 2. The following description assumes that the modem 330_1 and the radio transceiver 350_1 are used by the current RAT: The main controller 310 provides the TIMER_PS, and after the TIMER_PS times out, the main controller 310 collects data and evaluates download qualities for all RATs via the modem 331_1 to 330_N and the radio transceivers 350_1 to 350_N, and sorts the data download qualities of non-current RATs (that is, the current is excluded) in descending order to obtain a "candidate RAT list". The main controller 310 evaluates the PS download quality of the current RAT, and selects another RAT to switch from the candidate RAT list according to the evaluation results. During the RAT switching, the main controller 310 controls the switched modem and radio transceiver to complete a registration. Detailed technical features may refer to the description of FIG. 1. After the registration is completed, the main controller 310 controls the switched modem and radio transceiver to send a TCP SYN packet to the transmitter to re-establish the TCP connection. Detailed technical features may refer to the description of FIG. 2.

The spirit of the invention can be understood by those skilled in the art after reading the above passages. Those artisans will further appreciate that the various illustrative modules, units, and process steps described may be implemented as electronic hardware, software being executed by a processor, or a combination thereof. To clearly illustrate this interchangeability of hardware and software, various illustrative components, modules, and steps have been described above generally in terms of their functionality. Whether such functionality is implemented as hardware or software depends upon the particular application and design constraints imposed on the overall system. If the functionality is implemented by software, the software may reside in a storage medium, such as a RAM (Random Access Memory), a flash memory, a ROM (Read-only Memory), EPROM (Erasable Programmable Read Only Memory), EEPROM (Electrically-Erasable Programmable Read Only Memory) memory, registers, a hard disk, a removable disk, a CD-ROM, or any other form of computer-readable storage medium known in the art. An exemplary storage medium may be coupled to a processor, such that the processor can read information from and write information to the storage medium. The various illustrative modules or units in connection with the aspects disclosed herein may be implemented within or performed by a general purpose processor, a DSP (digital signal processor), an ASIC (application specific integrated circuit), a FPGA (field programmable gate array) or another programmable logic device, discrete gate or transistor logic, discrete hardware component, electrical component, optical component, mechanical component, or any combination thereof designed to perform the functions described herein. The general purpose processor may be a microprocessor, but in the alternative, the processor may be any conventional processor, controller, microcontroller, or state machine. The processor may also be implemented as a combination of computing devices, e.g., a combination of a DSP and a microprocessor, a plurality of microprocessors, one or more microprocessors in conjunction with a DSP core, or any other such configuration.

Those skilled in the art may use various means to practice the above functionality for every particular application, but such practice cannot be considered as being outside of the claimed scope of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for fast recovery, characterized by, comprising:
   evaluating data download qualities of a plurality of non-current RATs (Radio Access Technologies) to obtain a candidate RAT list, wherein for obtaining the candidate RAT list, the method includes: providing a minimum acceptable level of a plurality of signal strength levels for each non-current RAT, removing the non-current RAT or RATs whose signal strength or strengths are lower than its or their minimum acceptable level, and sorting the remaining non-current RATs according to the fallen signal strength levels in descending order to obtain the candidate RAT list;
   determining whether a PS (Packet Service) download quality of a current RAT becomes worse; and
   if the PS download quality of the current RAT becomes worse, selecting one RAT from the candidate RAT list and switching to the selected RAT.

2. The method of claim 1, characterized by, further comprising:
   providing a PS quality timer and determining whether the PS quality timer has timed out and a restart count of the PS quality timer has reached a maximum restart number; and
   after determining that the PS quality timer has timed out and the restart count of the PS quality timer has not reached the maximum restart number, evaluating the data download qualities of the non-current RATs to obtain the candidate RAT list.

3. The method of claim 2, characterized by, further comprising:
   after determining that the PS quality timer has timed out and the restart count of the PS quality timer has reached the maximum restart number, if a modem of the current RAT loses service, performing a network search operation.

4. The method of claim 2, characterized by, wherein the steps for providing a PS quality timer and determining whether the PS quality timer has timed out further comprises:
   providing a specified time interval of the PS quality timer; and
   determining whether the PS quality timer has timed out according to the specified time interval.

5. The method of claim 1, characterized by, further comprising:
   calculating the data download quality of the current RAT according to a plurality of parameters, wherein the plurality of parameters comprise a signal strength of the current RAT, signal strengths of the plurality of non-current RATs, and a percentage of a total number of bad blocks, which cannot be decoded during PS data transmission, over a total number of all received data blocks; and
   calculating the data download qualities of the plurality of non-current RATs according to signal strengths of the plurality of non-current RATs.

6. The method of claim 1, characterized by, wherein the step for determining whether a PS (Packet Service) download quality of a current RAT becomes worse further comprises:
   determining whether the PS download quality of the current RAT is greater than or equals to a threshold value corresponding to the current RAT.

7. The method of claim 1, characterized by, wherein the step for selecting one RAT from the candidate RAT list and switching to the selected RAT further comprises:
   when the candidate RAT list is empty, staying in the current RAT; and
   when the candidate RAT list is not empty, switching to the RAT associated with the top item on the candidate RAT list and removing the top item from the candidate RAT list.

8. A method for fast recovery, characterized by, comprising:
   after switching RAT (Radio Access Technology), sending a TCP (Transmission Control Protocol) SYN (Synchronization) packet to a transmitter, wherein the step of switching RAT includes: evaluating data download qualities of a plurality of non-current RATs (Radio Access Technologies) to obtain a candidate RAT list, wherein for obtaining the candidate RAT list, the method includes: providing a minimum acceptable level of a plurality of signal strength levels for each non-current RAT, removing the non-current RAT or RATs whose signal strength or strengths are lower than its or their minimum acceptable level, and sorting the remaining non-current RATs according to the fallen signal strength levels in descending order to obtain the candidate RAT list; determining whether a PS (Packet Service) download quality of a current RAT becomes worse; and if the PS download quality of the current RAT becomes worse, selecting one RAT from the candidate RAT list and switching to the selected RAT.

9. The method of claim 8, characterized by, further comprising:
   after switching RAT, determining whether a total number of sending TCP SYN packets has reached an allowable maximum; and if the total number of sending TCP SYN packets has not reached the allowable maximum, sending the TCP SYN packet to the transmitter.

10. The method of claim 8, characterized by, further comprising:
determining whether to continue a data download according to a sending result of the TCP SYN packet.

11. The method of claim 10, characterized by, wherein the step for determining whether to continue a data download according to a sending result of the TCP SYN packet further comprises:
determining whether a TCP SYN ACK (acknowledge) has been received; and
when the TCP SYN ACK has been received, determining whether a new data packet has been received.

12. The method of claim 11, characterized by, further comprising:
when the new data packet has been received, continuing the data download.

13. An apparatus for fast recovery, characterized by, comprising:
N modems, wherein each of the N modems belongs to one RAT (Radio Access Technology), wherein N is a positive integer greater than 2; and
a main controller collecting data via the N modems, evaluating data download qualities of a plurality of non-current RATs (Radio Access Technologies) to obtain a candidate RAT list, wherein for obtaining the candidate RAT list, the method includes: providing a minimum acceptable level of a plurality of signal strength levels for each non-current RAT, removing the non-current RAT or RATs whose signal strength or strengths are lower than its or their minimum acceptable level, and sorting the remaining non-current RATs according to the fallen signal strength levels in descending order to obtain the candidate RAT list; and if a PS (Packet Service) download quality of the current RAT becomes worse, selecting one RAT from the candidate RAT list and switching to the associated modem to perform data download.

14. The apparatus of claim 13, characterized by, wherein the main controller provides a PS quality timer and determines whether the PS quality timer has timed out and a restart count of the PS quality timer has reached a maximum restart number; and after determining that the PS quality timer has timed out and the restart count of the PS quality timer has not reached the maximum restart number, evaluates the data download qualities of the non-current RATs to obtain the candidate RAT list.

15. The apparatus of claim 14, characterized by, wherein the main controller, after determining that the PS quality timer has timed out and the restart count of the PS quality timer has reached the maximum restart number, if the modem of the current RAT loses service, performs a network search operation.

16. The apparatus of claim 14, characterized by, wherein the main controller provides a specified time interval of the PS quality timer; and determines whether the PS quality timer has timed out according to the specified time interval.

17. The apparatus of claim 13, characterized by, wherein the main controller calculates the data download quality of the current RAT according to a plurality of parameters, wherein the parameters comprise a signal strength of the current RAT, signal strengths of the plurality of non-current RATs, and a percentage of a total number of bad blocks, which cannot be decoded during PS data transmission, over a total number of all received data blocks; and calculates the data download qualities of the plurality of non-current RATs according to signal strengths of the plurality of non-current RATs.

18. The apparatus of claim 13, characterized by, wherein the main controller determines whether the PS download quality of the current RAT is greater than or equals to a threshold value corresponding to the current RAT.

19. The apparatus of claim 13, characterized by, wherein the main controller, when the candidate RAT list is empty, stays in the current RAT; and when the candidate RAT list is not empty, switches to the RAT associated with the top item on the candidate RAT list and removing the top item from the candidate RAT list.

20. An apparatus for fast recovery, characterized by, comprising:
N modems, wherein each of the N modems belongs to one RAT (Radio Access Technology), wherein N is a positive integer greater than 2; and
a main controller, after switching RAT (Radio Access Technology), sending a TCP (Transmission Control Protocol) SYN (Synchronization) packet to a transmitter, wherein the step of switching RAT includes: evaluating data download qualities of a plurality of non-current RATs (Radio Access Technologies) to obtain a candidate RAT list, wherein for obtaining the candidate RAT list, the method includes: providing a minimum acceptable level of a plurality of signal strength levels for each non-current RAT, removing the non-current RAT or RATs whose signal strength or strengths are lower than its or their minimum acceptable level, and sorting the remaining non-current RATs according to the fallen signal strength levels in descending order to obtain the candidate RAT list; determining whether a PS (Packet Service) download quality of a current RAT becomes worse; and if the PS download quality of the current RAT becomes worse, selecting one RAT from the candidate RAT list and switching to the selected RAT.

21. The apparatus of claim 20, characterized by, wherein the main controller, after switching RAT, determines whether a total number for sending TCP SYN packets has reached an allowable maximum; and if the total number for sending TCP SYN packets has not reached the allowable maximum, sends the TCP SYN packet to the transmitter.

22. The apparatus of claim 20, characterized by, wherein the main controller determines whether to continue a data download according to a sending result of the TCP SYN packet.

23. The apparatus of claim 22, characterized by, wherein the main controller determines whether a TCP SYN ACK (acknowledge) has been received; and when the TCP SYN ACK has been received, determines whether a new data packet has been received.

24. The apparatus of claim 23, characterized by, wherein the main controller, when the new data packet has been received, continues the data download.

* * * * *